Figure 1:
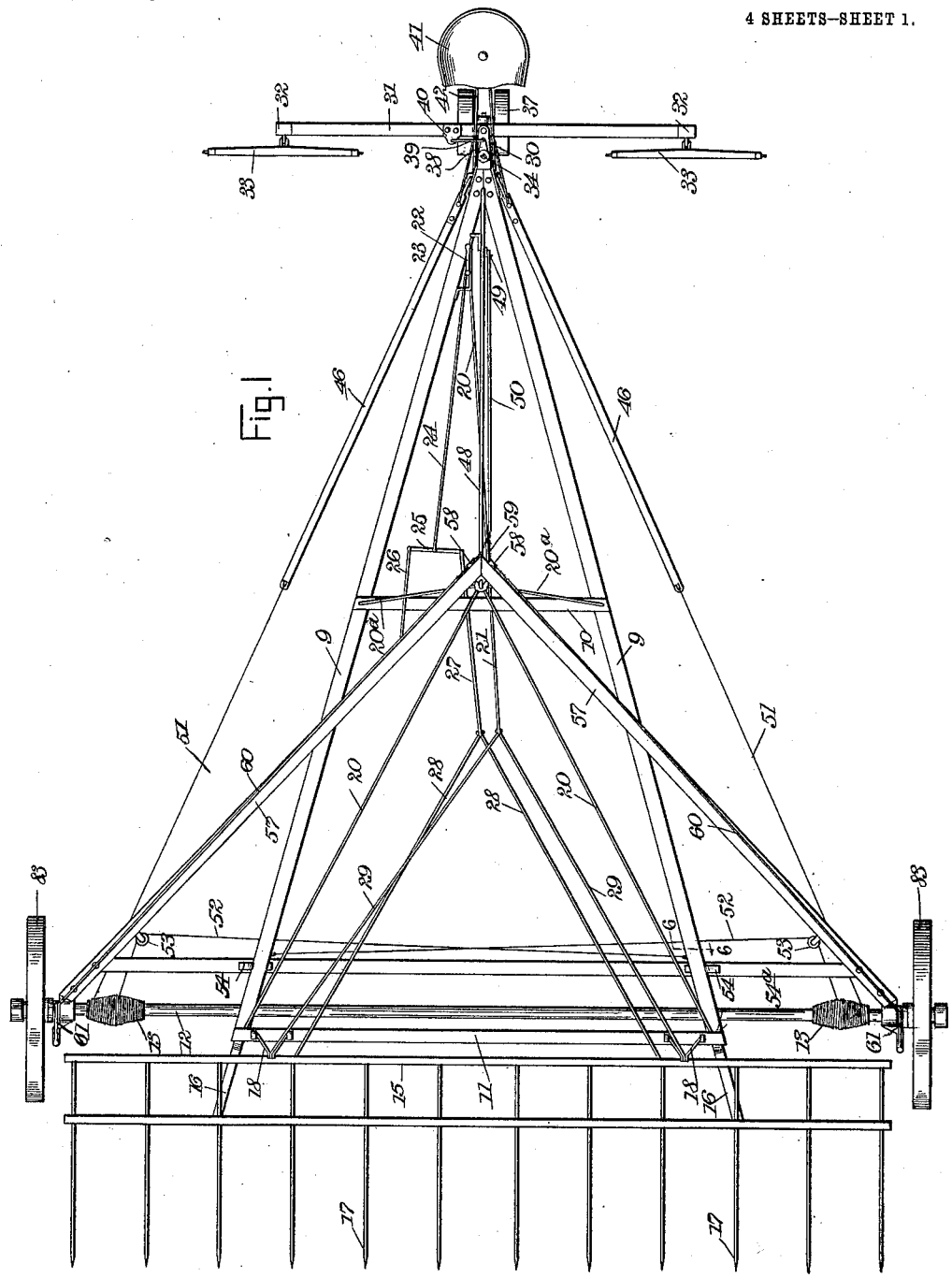

O. L. WAGGONER.
STACKER.
APPLICATION FILED APR. 22, 1911.

1,029,520.

Patented June 11, 1912.
4 SHEETS—SHEET 1.

WITNESSES:

INVENTOR
Orva L. Waggoner
BY
ATTORNEYS

O. L. WAGGONER.
STACKER.
APPLICATION FILED APR. 22, 1911.
1,029,520.
Patented June 11, 1912.
4 SHEETS—SHEET 2.
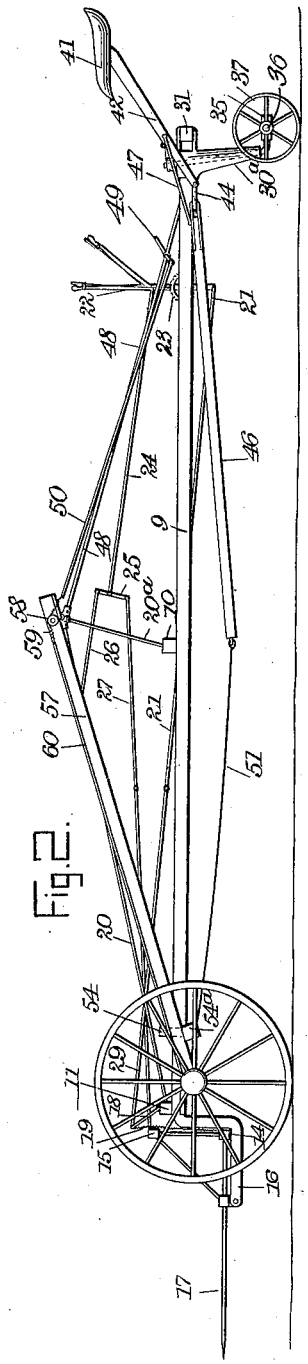
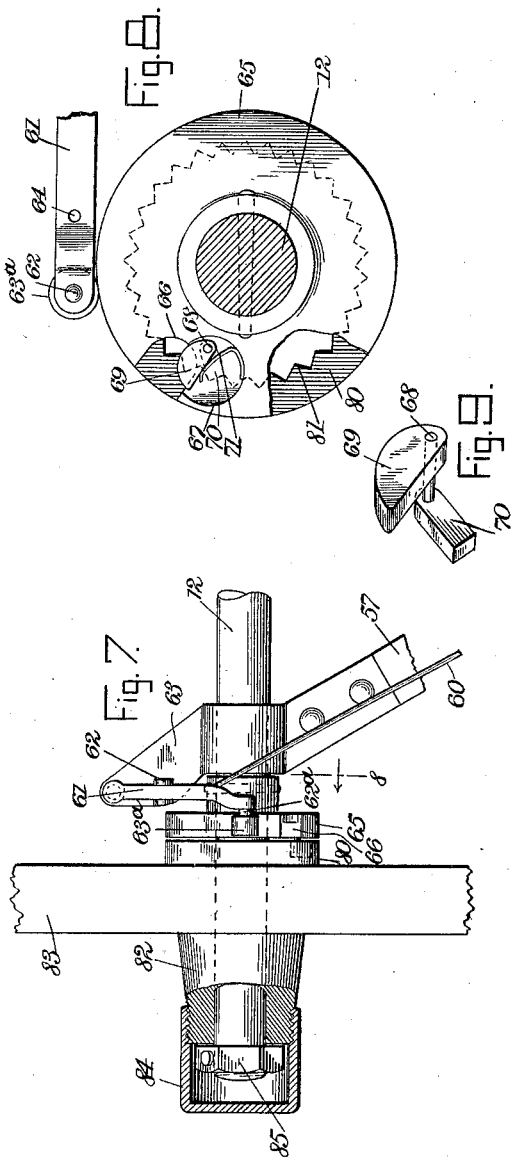
WITNESSES:
C. H. Reichenbach.
Walton Harrison
INVENTOR
Orva L. Waggoner
BY Munn & Co.
ATTORNEYS

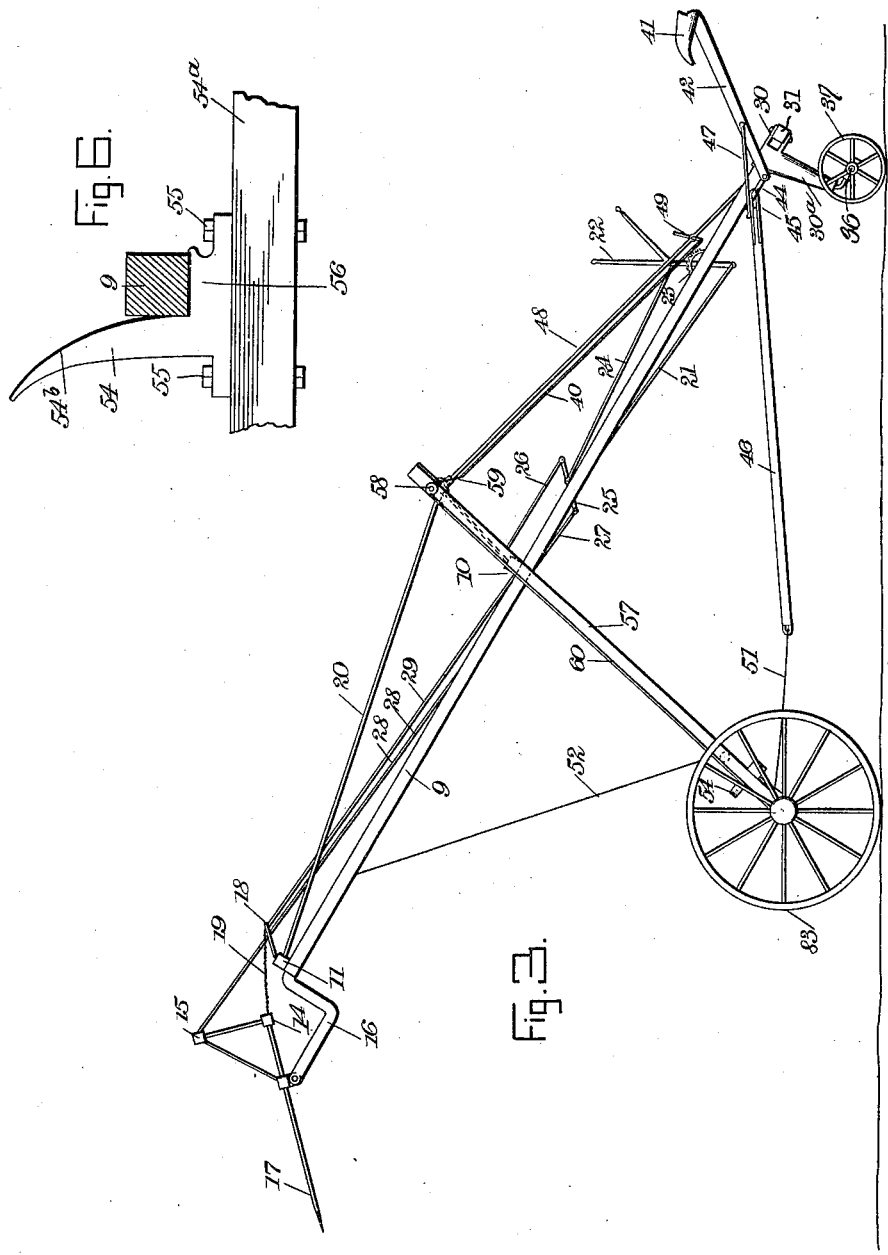

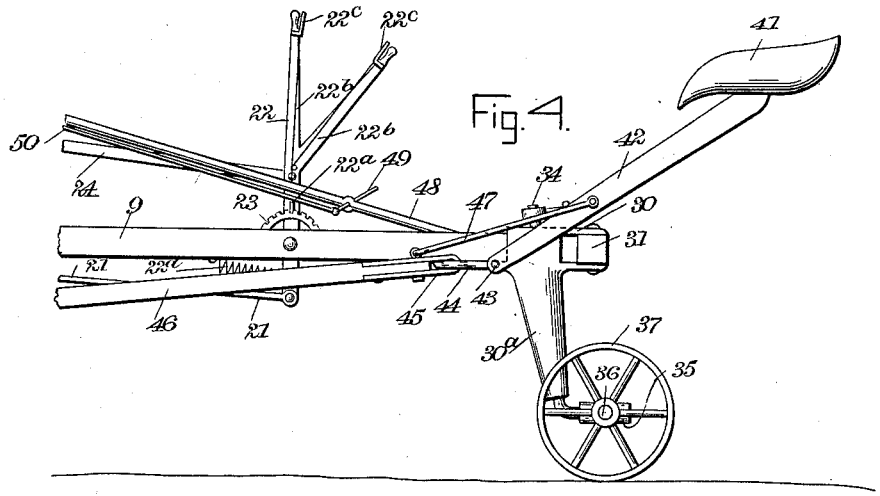

UNITED STATES PATENT OFFICE.

ORVA LESLIE WAGGONER, OF LATHAM, KANSAS.

STACKER.

1,029,520.　　　　Specification of Letters Patent.　　Patented June 11, 1912.

Application filed April 22, 1911. Serial No. 622,722.

*To all whom it may concern:*

Be it known that I, ORVA L. WAGGONER, a citizen of the United States, and a resident of Latham, in the county of Butler and State of Kansas, have invented a new and Improved Stacker, of which the following is a full, clear, and exact description.

My invention relates to stackers of the kind employed more particularly for stacking and piling up hay, straw and analogous materials.

More particularly stated, I provide a type of stacker having a framework mounted upon wheels and carrying a rake head, the parts being so mounted and arranged that the rear wheels may be moved forward rapidly in relation to the front wheels, thus causing a part of the framework to bow or rise upwardly carrying with it the rake head so as to elevate the rake head to any desired height within reasonable limits, and thus facilitate the discharge of the hay at any desired level.

My invention further comprehends various details whereby the rake head carrying the charge of hay is lifted, the hay discharged and the rake head then lowered to its normal position.

My invention further comprehends various mechanical improvements, including an improved type of clutch for causing the vehicle wheels to actuate the parts employed in connection with the lifting and lowering of the rake head.

Reference is to be had to the accompanying drawings forming a part of this specification in which like characters of reference indicate corresponding parts in all the views, and in which—

Figure 1 is a plan view of my stacker ready for use, and showing the parts in normal position; Fig. 2 is a side elevation of the same; Fig. 3 is also a side elevation, but showing the rake head as elevated for the purpose of discharging the hay; Fig. 4 is a fragmentary side elevation of the various parts disposed at the rear of the stacker; Fig. 5 is a fragmentary plan view of the mechanism appearing in Fig. 4; Fig. 6 is an enlarged section on the line 6—6 in Fig. 1, looking in the direction of the arrow and showing one of the chairs for temporarily supporting certain movable parts of the framework; Fig. 7 is a fragmentary view partly in elevation and partly broken away, showing the clutch mechanism for gearing together the front axle of the vehicle and the parts employed directly for lifting the rake; Fig. 8 is a section on the line 8—8 in Fig. 7, looking in the direction of the arrow and showing further details of the clutch mechanism; and Fig. 9 is a detail showing in perspective the pawls forming part of one of the clutch mechanisms.

Two frame members 9 are inclined relatively to each other and extending across from one of these frame members to the other are two cross beams 10, 11. The frame members 9 and the two cross beams together constitute a light A-frame. Extending crosswise of this A-frame and disposed below the latter is a revoluble axle 12 provided with pulleys 13 each having generally the form of a double cone with its ends of smaller diameter extending in opposite directions from the portion of largest diameter. The pulleys are mounted rigidly upon the axle 12 and revoluble therewith. A rake head is shown at 14 (see upper left hand portion of Fig. 3), and is provided with a cross bar 15. This rake head is pivotally mounted upon a pair of supporting rods 16 which are bent downwardly and forwardly in the form shown in Fig. 3, and secured rigidly upon the frame members 9. The rake head 14 is provided with rake teeth 17 which are inclined at different angles relatively to the frame members 9 as the rake head is tilted as hereinafter described.

Journaled upon the cross beam 11 is a pair of cranks 18, each having generally the form of an inverted V, (see Fig. 1), and adapted to rock upon the cross beam 10. Connected with the rake head 14, (see Fig. 3) are chains 19 which are also secured to the cranks 18. Two brace rods 20 are connected with the cross beam 11 and also connected with a pair of brace rods 20ª, the latter being secured at their outer ends to the outer ends of the cross beam 10. A rod 21 is connected with the bottom end of a hand lever 22, this lever being journaled upon one of the frame members 9 and provided with two handles which project upwardly and diverge from each other, as will be understood from Fig. 4.

Disposed adjacent the hand lever 22 is a stationary sector 23, (see Fig. 4), provided with teeth which are engaged by a pawl 22ª carried by the hand lever 22. Two pawl rods 22ᵇ are connected together and also connected with the pawl 22ª. These pawl rods are operated by aid of handles 22ᶜ under direct control of the operator. By pressing either one of the handles 22ᶜ the operator can disengage the pawl 22ª from the sector 23, and this frees the hand lever 22 so that the operator, by manipulating either or both of the handles of the hand lever 22, can swing it forward or backward as desired. A spring 22ᵈ tends to retract the hand lever to normal position.

Pivotally connected with the hand lever 22 is a rod 24 which extends forwardly, and at its front end is pivotally connected with a lever 25. Connected with one end of this lever is a rod 26 secured as hereinafter described. Connected with the other end of the lever 25 is a rod 27 and secured to this rod are two other rods 28 which diverge from each other and are secured to the cross bar 15 of the rake head, as will be understood from Fig. 3. The operator, by swinging the hand lever 22 forward or backward, may cause the rake head to swing to a greater or lesser extent upon its bearings. Connected with the rod 21 are two other rods 29 which diverge from each other and at their forward ends are pivotally connected with the cranks 18. Whenever the cranks 18 are swung backward (see Fig. 3), the rake head is tilted, owing to the fact that the chains 19 pull upon it, thus causing it to tilt relatively to its mountings, as will be understood from Fig. 3.

At the rear of the machine is a casting 30, and pivotally connected with the latter is a double tree 31. This double tree is provided at its ends with cuffs 32 and swiveled to the latter are swingle trees 33, to which draft animals may be harnessed in order to actuate the machine. The casting 30 is provided with a downwardly extending portion 30ª constituting a bearing, and extending through this bearing is a caster stem 34. The lower end of this caster stem is bent backwardly and carries a casting 35 through which extends a short axle 36. Mounted upon opposite ends of the axle are wheels 37. An arm 38 is secured directly to the caster stem 34 and extends laterally therefrom in a horizontal direction, as will be understood from Fig. 5. A link 39 is pivotally connected with the outer or free end of this arm, and is also pivotally connected to a plate 40 carried by the double tree 31.

Whenever one end of the double tree 31 is carried forward of the other end, the arm 38 is caused to rock, and the caster stem 34 causes the axle 36 to swing slightly from its normal position. The wheels 37 thus assume new positions relatively to the framework. The purpose of this arrangement is to enable the machine to be turned readily and also, in a measure, to equalize the distribution of the work as between the two draft animals. Suppose, for instance, that two horses are, by aid of appropriate harness, connected with the swingle trees 33 and that one of these horses is considerably stronger than the other. I will say that the horse at the driver's left is the stronger of the two and that this horse pulls the adjacent end of the double tree 31 so hard that the double tree swings to a new position and assumes a considerable angle to its normal position. The arm 38 actuated by the link 39 swings in the same direction as the double tree, and the wheels 37 are in consequence turned slightly in a contra clockwise direction according to Fig. 1.

A seat 41 is mounted upon a pair of seat posts 42, the latter being held in position by aid of pivots 43. The casting 30 is provided with an extending portion 44 which supports the pivots 43. An eye 45 is swiveled relatively to the extending portion 44 and is carried by a rod 46. There are two of these rods 46, and connected with them are two links 47, the latter being pivotally connected to the two seat posts 42. The parts are so arranged that whenever the frame members 9 are raised at their front ends, the rods 46, not being thus raised, cause the links 47 to pull upon the seat posts 42 so that the seat 41 is not lowered. The net result is that whenever the frame members 9 at their front ends are raised in order to discharge the hay carried by the rake head, the driver's seat is not lowered in consequence, as it otherwise would be except for the compensating action of the links 47 as controlled in part by the rods 46.

At 48 is a brace rod which is connected with the brace rods 20, 20ª, and is also connected with the frame members 9 at their junction. A foot lever 49 is journaled upon the brace rod 48 and disposed within convenient reach of the driver as he sits upon the seat 41.

Pivotally mounted on the foot lever 49 and extending therefrom is a rod 50, which, together with the other parts hereinafter described, is employed for manipulating the clutches. Connected with the rods 46 are two cords 51 which are wound upon the double pulleys 13, as will be understood from Fig. 1. These cords are secured to the outermost portions of the pulleys—that is—to the portions nearest the respective front wheels, these portions being of small diameter. The arrangement of the pulleys and cords is such that when the pulleys are turned, the cords 51, being connected to the outer ends of the pulleys are gradually wound upon the outermost portions of progressively greater diameter. To the inner portions of the pulleys 13, that is, the portions facing each other, are secured cords 52, which pass around pulleys 53 and have their other end secured to the members 9 of the A-frame, the cord from pulley 13 at the right-hand side of the stacker being secured to the member of the said frame at the left-hand side, and vice-versa. As these pulleys turn and gradually wind up the cords 51, they also unwind the cords 52, and as the cords 52 thus unwind from the pulleys, the successive loops unwound are of successively smaller diameter.

At 54$^a$ is a cross beam, and mounted rigidly upon the same are two chairs 54, each of substantially the construction shown in Fig. 6. These chairs are held down by bolts 55 upon the cross beam 54$^a$, and provided respectively with seats 56 upon which the frame members 9 are adapted to rest, as will be understood from Fig. 6. Each chair 54 is provided with a curved bearing surface 54$^b$, which serves as guides for the frame members 9, as will be understood from the figure just mentioned.

At 57 are two frame members which meet at an obtuse angle, and thus forming a substantially V-shaped frame. This frame carries two pulleys 58, and engaging the latter are chains 59, these chains also engaging the rod 50 and being thereby controlled by aid of the foot lever 49. Connected with the cords 59 are rods 60 which diverge and extend substantially in the same directions as the frame members 57. Each rod 60 is connected with a lever 61, and the latter is, by aid of bearings 62, (see Fig. 7), pivotally mounted upon a bracket 63 carried by the adjacent frame member 57. Each lever 61 carries a cam pin 62$^a$, and mounted upon the latter is a cam roller 63$^a$. Each lever 61 is further provided with a hole 64, (see Fig. 8) to facilitate the connection of the rod 60 with it. Adjacent to each cam roller 63$^a$ is a cam disk 65 which is provided with a notch 66 into which the cam roller 63$^a$ fits loosely but neatly. The cam disk 65 is further provided with a slight indentation 67 which at one end of its edges merges into the notch 66 as will be understood from Fig. 8. When the cam roller 63$^a$ is in the notch 66, the axle 12 is locked securely and unable to turn. Mounted within the indentation 67 by aid of a pin 68 is a pawl 69 having a substantially semi-circular form, as will be understood from Figs. 8 and 9. The pin 68 is rigid relatively to the pawl 69. Another pawl 70 is mounted rigidly upon the pin 68. A leaf spring 71 is disposed within the indentation 67 and presses constantly against the pawl 69. Whenever the cam roller 63$^a$ enters the notch 66, it displaces the pawl 69, turning the latter in a counter-clockwise direction according to Fig. 8, and increasing the tension of the spring 71. In doing this the pin 68 is turned slightly in counter-clockwise direction and causes the pawl 70 to rock in the direction just stated. Another cam disk is shown at 80 and is provided internally with teeth 81. This cam disk is separate from the cam disk 65 and so arranged relatively to the latter that the pawl 70, though carried by the cam disk 65, may be brought into and out of engagement with the teeth 81 by the turning movements of the pin 68 under control of the pawl 69. Whenever the cam roller 63$^a$ enters the notch 66 and turns the pawl 69 in a counter clockwise direction as above stated, the pawl 70 is thereby released from engagement with the teeth 81 and the cam disk 80 is thus freely disengaged from the disk 65. When, however, the cam roller 63$^a$ is, by action of the rod 60, drawn out of the notch 66 as indicated in Fig. 8, the pawl 69, under tension of the spring 71, is turned into its normal position as indicated in Fig. 8, and the pawl 70 is brought into engagement with the teeth 81. The two disks 65 and 80 are thus effectively locked and adapted to rotate as a unit, power being supplied from the disk 80 to the disk 65.

From the foregoing description it will be noted that the disks 65 and 80 constitute practically the driving and driven members of the clutch. Each disk is practically a part of a hub 82 of one of the wheels 83 which engages the ground. Each hub 82 is provided with a cap 84 in which is a nut 85, the latter being mounted upon the end of the axle 12 so that the wheel including the hub 82 and cap 84 may turn freely upon the axle 12, except when the clutch members are locked together, as above described.

The operation of my device is as follows: Draft animals having been harnessed to the swingle trees 33 as above described, the driver sits upon the seat 41 and by driving the animals forward causes the machine to move in the same direction. The operator, by manipulating the hand lever 22, causes the rake teeth 17 to be lowered and to gather up a charge of hay. Arriving now in the vicinity of the hay stack or other objective point at which the hay is to be stored, or at least lifted up and discharged, the operator watches his opportunity and as soon as the machine is apparently at a proper predetermined distance from the objective point, he actuates the foot lever 49 by pushing the top part of the lever forward. This causes motion to be transmitted to the rods 50 and thence to the chains 59, rods 60 and cam levers 61, which are thus raised out of their normal positions, the cam rollers 63$^a$ being lifted out of the notch 66, as indicated in Fig. 8. The disks 80 and 65, serving as clutch members as above described, and the rake teeth are now approximately level, if the operator skilfully manipulates the hand lever 22. As above explained, the operator's seat is not lowered by the rising of the charge of hay carried by the rake head. In order to discharge the hay carried by the rake head, the operator presses the top of the hand lever 22 forward. This causes the rods 24 and 27 to move forwardly and backwardly upon their mountings and discharge the hay. This being accomplished, and the operator wishing to remove the machine from the hay stack, he grasps the handles of the hand lever 22, and by pulling upon the same he restores the rake head to its normal position relatively to its mountings. He then merely backs the team out, and in so doing the turning of the wheels 83 restores the movable frame members to their normal positions. This being done, the operator, by actuating the foot lever 49, moves the rods 50, the chains 59 and the rods 60 in such manner as to rock the cam levers 61, and this brings the cam rollers 63ª into suitable position to snap into the notches 66; and when this is done the cam pin 68 is rocked, as above described and the clutch members are released. In backing the team out, the various frame members are lowered so that the apparatus now assumes the position indicated in Fig. 2.

It will be noted that as the frame members 9 are gradually raised at their forward ends, (see Fig. 3), the cords 51 (see Fig. 1) are wound upon progressively larger portions of the pulleys, and the cords 52 are gradually unwound from portions of said larger diameter to portions of smaller diameter. The net result of this gearing is that the upward movement of the rake head is accelerated toward the latter part of the lift. This compensates in a measure, at least, for the fact that otherwise the rake head would not be lifted very rapidly after the frame members 9 become nearly vertical. Again, when the lift first commences, the parts are subjected to considerable strain and as the rake head is gradually raised, less lifting power is required and consequently it is desirable that the speed be accelerated so that the entire work done in lifting may be substantially uniform throughout the entire lift, and not considered as a task for raising a burden vertically.

The stacker above described presents quite a number of practical advantages. The load of hay is raised almost vertically, thus obviating any tendency for the machine to tip over toward the front. There being no vertical tower to be carried, the machine is not top-heavy and may be carried over rough ground. The absence of a tower also lessens the liability for the machine to be tangled up in telephone wires and overhead limbs of trees. While the load is being raised most of the weight rests upon the front wheels and these do not travel as fast as the rear wheels. This fact lessens the draft, that is, the power required by the horses to drag the machine forward. The machine places practically no weight upon the necks of the draft animals. As the clutch mechanism is thrown into action while the machine is in motion, no time is lost on account of gripping and releasing the clutch mechanism. The double ended cone pulleys greatly lessen the strain upon the cords by apportioning the load to the power. The tapering of the cone pulleys also enables a lighter axle having less diameter to be employed.

I do not limit myself to the precise arrangement of the various parts shown, as they may be varied to suit different requirements. Neither do I limit myself to any particular material to be used in the construction of my apparatus.

Having thus described my invention, what I claim as new and desire to secure by Letters Patent is:—

1. A stacker comprising a pair of vehicle wheels supporting a revoluble axle, a second pair of wheels movable bodily in relation to said first-mentioned wheels and to said axle, and disposed to the rear of the same, a member to be pulled upon by draft animals in order to cause the entire machine to move forward, and mechanism controllable by movements of said member for shifting the said second-mentioned wheels relatively to the position of said first-mentioned wheels and said axle supported thereby.

2. In a stacker, the combination of a pair of front wheels, an axle supported thereby, a pair of rear wheels, a frame member supported at one of its ends by said front wheels, a second frame member supported at one of its ends by said rear wheels, a rake head carried by said second-mentioned frame at the end thereof opposite said second-mentioned wheels, and mechanism controllable by movements in the general position of said second-mentioned wheels relatively to said first-mentioned wheels for lifting said rake head.

3. In a stacker, the combination of a pair of front wheels, an axle supported thereby, a pair of rear wheels, a frame member supported at one of its ends by said front wheels, a frame member supported by said second-mentioned frame at the end thereof opposite said second-mentioned wheels, mechanism controllable by movements in the general position of said second-mentioned wheels relatively to said first-mentioned wheels for lifting said rake head, and mechanism connected with said rake head and controllable at will of the operator for enabling him to actuate said rake head when the latter is raised.

4. In a stacker, the combination of front wheels, rear wheels, a frame member supported at one of its ends by said front wheels, another frame member supported at one of its ends by said rear wheels, a rake head carried by one of said frame members, connections from the frame member carrying said rake head to the other frame member, mechanism controllable by the rotation of said front wheels for moving said rear wheels for gradually shifting the position of said rear wheels to render the latter closer to or farther from said front wheels, and connections from said mechanism to said rake head for lifting or lowering the latter as the general position of said rear wheels is shifted relatively to the position of said front wheels.

5. In a stacker, the combination of front wheels, rear wheels, a frame member supported at one of its ends by said front wheels, another frame member supported at one of its ends by said rear wheels, a rake head carried by one of said frame members, connections from the frame member carrying said rake head to the other frame member, mechanism controllable by the rotation of said front wheels for moving said rear wheels for gradually shifting the position of said rear wheels to render the latter closer to or farther from said front wheels, connections from said mechanism to said rake head for lifting or lowering the latter as the general position of said rear wheels is shifted relatively to the position of said front wheels, and means controllable at the will of the operator for turning said rake head at any desired height thereof.

6. In a stacker, the combination of wheels, framework mounted thereupon and adapted to be tilted, a rake head supported by said framework and raised whenever the latter is tilted, a seat post journaled upon said framework, a seat carried by said seat post, and mechanism connected with said framework and with said seat post for shifting the position of said seat post relatively to said framework in order to compensate for the tilting of said framework.

7. In a stacker, the combination of front wheels for engaging the ground, rear wheels for engaging the ground, framework connected with said front wheels and said rear wheels, means for shifting the general position of said rear wheels relatively to said front wheels, mechanism controllable by the shifting movement of said rear wheels relatively to said front wheels for elevating a portion of said framework, and a rake head carried by said mechanism.

8. In a stacker, the combination of a pair of front wheels for engaging the ground, a pair of rear wheels for engaging the ground, a revoluble axle supported by said front wheels, a clutch mechanism controllable at the will of the operator for causing said axle to become loose or fixed as desired relatively to said front wheels, conical pulleys mounted fixedly upon said axle and revoluble therewith, mechanism controllable by the rotation of said conical pulleys for drawing said rear wheels nearer to said front wheels or for allowing said rear wheels to move farther away from said front wheels, frame members supported by said front wheels and said rear wheels and movable relatively to each other so as to raise or lower a predetermined portion of one of said frame members, a rake head mounted upon said predetermined portion, and means controllable at the will of the operator for turning said rake head when in elevated position.

9. In a stacker, the combination of a longitudinal frame member, a rake head journaled adjacent one end of said frame member, a second frame member, connections from said second-mentioned frame member to said first-mentioned frame member for elevating the end thereof carrying said rake head, and mechanism for moving one of said frame members relatively to the other in order to cause said end of said first-mentioned frame member to be elevated, said mechanism including progressive gearing for accelerating the upward movement of said rake head relatively to the movements of said frame members.

In testimony whereof I have signed my name to this specification in the presence of two subscribing witnesses.

ORVA LESLIE WAGGONER.

Witnesses:
    KATHRYN GARNETT,
    LILA V. GARNETT.

---

Copies of this patent may be obtained for five cents each, by addressing the "Commissioner of Patents, Washington, D. C."